United States Patent [19]
Schmidt et al.

[11] Patent Number: 5,172,508
[45] Date of Patent: Dec. 22, 1992

[54] ILLUMINATED FISHING POLE

[76] Inventors: Mark O. Schmidt, 7915 E. 74th Terrace, Kansas City, Mo. 64129; Willard W. Bray, II, 7118 W. 85th St., Overland Park, Kans. 66212

[21] Appl. No.: 847,629

[22] Filed: Mar. 6, 1992

Related U.S. Application Data

[63] Continuation-in-part of Ser. No. 628,622, Dec. 19, 1990, abandoned, which is a continuation-in-part of Ser. No. 497,087, Apr. 13, 1990, abandoned.

[51] Int. Cl.$^5$ .............................................. A01K 87/00
[52] U.S. Cl. ...................................... 43/18.1; 43/17.5
[58] Field of Search ................................. 43/17.5, 18.1

[56] References Cited

U.S. PATENT DOCUMENTS

| | | | |
|---|---|---|---|
| 3,862,509 | 1/1975 | Petersen et al. | 43/18.1 |
| 4,026,059 | 5/1977 | Ochs | 43/17.5 |
| 4,085,437 | 4/1978 | Hrdlicka et al. | 43/17.5 |
| 4,117,618 | 10/1978 | Utsler | 43/17.5 |
| 4,775,920 | 10/1988 | Seibert et al. | 43/17.5 |

FOREIGN PATENT DOCUMENTS 2170081 7/1986 United Kingdom ................. 43/17.5

Primary Examiner—Richard K. Seidel
Assistant Examiner—Chuck Y. Mah
Attorney, Agent, or Firm—Kokjer, Kircher, Bowman & Johnson

[57] ABSTRACT

An illuminated fishing rod having a self-contained light source. The rod includes an at least translucent pole and a handle connected to the pole. The handle has a cavity therein and which receives an end of the pole. A self contained light source, for example a hand-held flashlight, is removably housed within the cavity of the handle in operative proximity to the end of the pole. The activation switch of the light source may be accessible from the exterior of the handle. The pole may include a cavity therein open at the end connected to the handle. A plurality of fiber optic cables may be received within the pole cavity to conduct light along the pole.

2 Claims, 1 Drawing Sheet

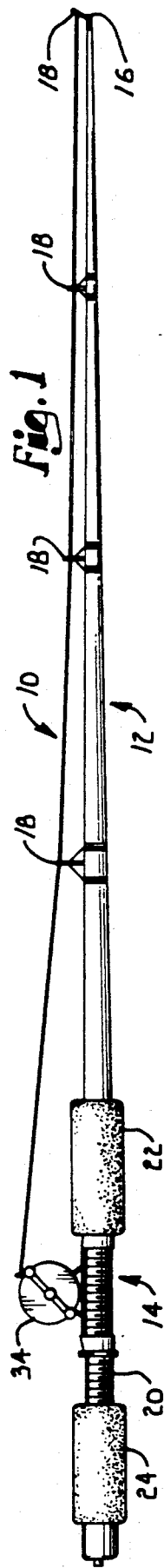
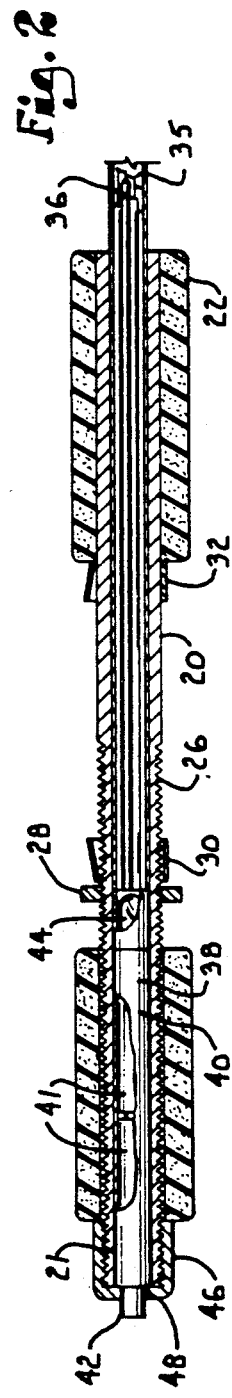
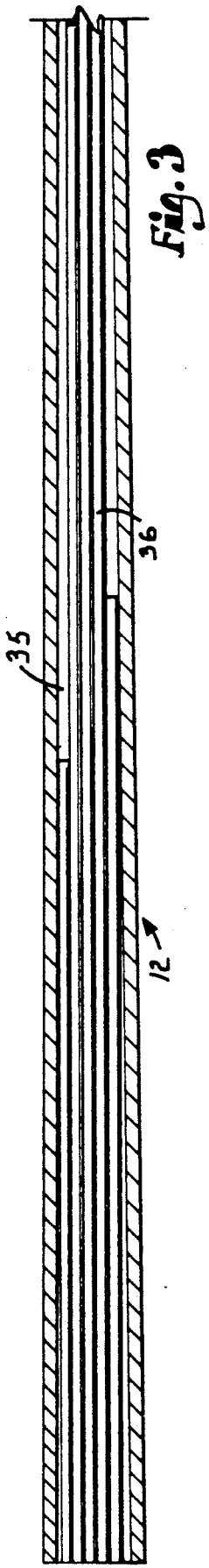
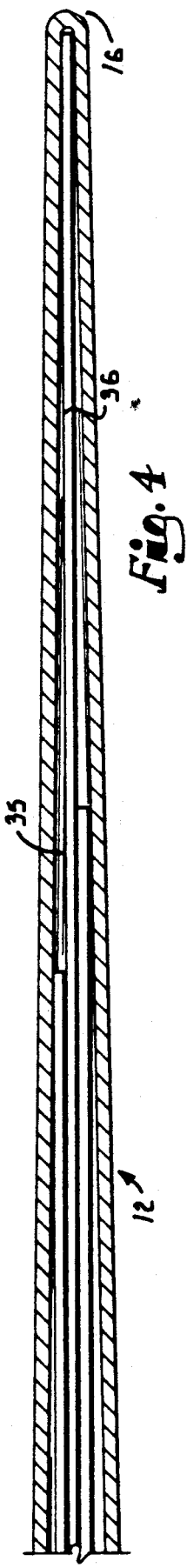

ILLUMINATED FISHING POLE

CROSS REFERENCE TO RELATED APPLICATION

This application is a continuation in part of Ser. No. 07/628,622 filed Dec. 17, 1990, now abandoned which application is a continuation in part of Ser. No. 07/497,087 filed Apr. 13, 1990, now abandoned.

BACKGROUND OF THE INVENTION

1. Field of the Invention

The present invention relates in general to fishing poles. In particular, the present invention relates to an improved fishing pole having a light source therein which is removable as a unit.

2. Description of the Related Art

It is often the case that fishing is best done at dawn or dusk or at other times when the lighting conditions are poor. This has caused difficulty in the visual monitoring of the end of the rod for movement indicating a strike. An additional light source is often used for the various tasks in the boat, for example, baiting the hook or changing a lure. However, the use of such light sources often has a detrimental effect upon the number of fish caught if the light source is of sufficient intensity to allow visual monitoring of the rod.

To overcome the problem of rod visibility, a number of illuminated fishing poles have been known. Some of these have included an exterior light source mounted on the rod or a light source in the handle illuminating the rod. These solutions have, however, been found lacking. The light sources mounted externally on the rods often include casting and free line movement. The illumination sources within the handles often result in incomplete or inadequate illumination of the rod. In addition, with either of these solutions, a separate light source is still required for the general tasks within the boat, as noted above.

SUMMARY OF THE INVENTION

An object of the present invention is to provide an illuminated fishing pole having a clear and bright illumination of the rod.

Another object of the present invention is to provide an illuminated fishing rod which is easy and economical to produce.

A further object of the present invention, is to provide a illuminated fishing rod having an internal illumination source which may be removed for use as a traditional light source within the boat.

These and other objects of the present invention are achieved by a lighted fishing pole having a translucent hole with a handle attached to one end thereof. The handle includes a self-contained light source which, when mounted in the handle, illuminates the interior of the pole. The pole, being transparent or translucent, is therefore illuminated. The handle is hollow to receive the self-contained light source. A switch mounted on the self-contained light source for activating same extends outwardly through the handle to allow manual activation while the light source is mounted within the handle. The light source may be removed from the handle and used as a standard hand-held flashlight.

To increase the illumination at the tip of the rod, the pole may include fiber optic cables extending therein. The self-contained light source would abut against a first-end of the fiber optic cables. The other end of the fiber optic cables would end at or near the tip of the pole, such that the light is conducted to the tip, as desired.

BRIEF DESCRIPTION OF THE DRAWINGS

The objects and features of the invention noted above are explained in more detail below with reference to the drawings, in which like reference numerals denote like elements, and in which:

FIG. 1 is a side view of an assembled pole according to the present invention;

FIG. 2 is a cross-sectional view of the handle area of the present invention, showing the self-contained light source mounted therein;

FIG. 3 is a cross-sectional view of the handle end of the pole including the fiber optic cables mounted therein;

FIG. 4 is a cross-sectional view of the tip end of the pole showing the fiber optic cables mounted therein.

DETAILED DESCRIPTION OF THE INVENTION

With reference to FIG. 1, the illuminated fishing pole according to the present invention is shown in its entirety. The fishing rod is generally designated by reference numeral 10, and includes a pole 12 and handle 14. The pole 12 is an elongated hollow member ending at a tip 16. The pole 12 is formed of a material allowing the conduction of light therethrough. Fiberglass is a typical and preferred material for construction of the pole 12. The pole 12 includes several line guides 18 for maintaining the fishing line in the proper position during use. The line guides 18 may be connected to the pole 12 in any manner typically known within the art.

The handle 14 includes a core 20 fixed to the rearward end of the pole 12. The handle core 20 is an essentially tubular member having a cavity 21 defined therein. As shown in FIG. 2, the pole 12 is received within the cavity 21 of handle core 20 and is fixed thereto by any suitable means, preferably adhesive. The handle core 20 includes first and second grips 22 and 24. The grips 22 and 24 are preferably of a soft foam allowing the user to comfortably grip the rod. The grips 22 and 24 may be connected to the handle core 20 by a friction fit, an adhesive or by any other typical means.

The rearward end of handle core 20 is threaded on the exterior thereof to form threads 26. Mounted on the threads 26 is a stop 28 forward of the second grip 24. The stop 28 provides a rear abutment for a rear reel mount 30. The reel mount is an essentially annular member surrounding the handle core 20 and is freely movable therealong.

A front reel mount 32 is also provided rearwardly of the first grip 22. The front reel mount 32 is essentially identical to the rear reel mount 30 and may be fixed to the handle core 20 or may be movable therealong. Each of the reel mounts includes a circumferential section which is spaced from the handle core 20. The ends of a fishing reel 34 may be inserted within these spaces. The stop 28 may then be rotated upon the threads 26 to move the rear wheel mount 30 forwardly along the handle core 20 to fix the reel 34 within the reel mounts 32, 30, and thus to the rod 10. Any other typical means of mounting a fishing reel to handle 14 could of course be employed.

As shown in FIGS. 2-4, the interior of the pole 12 includes a cavity 35 in which are received a plurality of fiber optic filaments or cables 36. Each of the cables 36 includes a rear end which is substantially flush with the open end of pole cavity 35 at the rear end of pole 12, and as such are accessible from the cavity 21 of handle core 20. This is shown in FIG. 3. The fiber optic cables 36 extend along the interior of the pole 12. Due to the taper of pole 12 and thus pole cavity 35, the fiber optic cables 36 may be of staggered length, such that the exterior periphery of the mass of cables 36 substantially corresponds to the interior diameter of the pole 12 at any point therealong. As shown in FIG. 4, at least one of the cables 36 extends as far as possible to the tip 16 of the pole 12. These fiber optic cables will act to conduct the light therealong with little loss, providing a source of illumination at each of their forward ends.

The illumination conducted by the cables 36 is provided by a self-contained light source 38. The light source 38 includes an outer casing, a light bulb 44 mounted within the casing 40, batteries 41 also mounted within the casing for powering the light bulb, and a switch 42 for activating the light bulb, also connected to the casing. The self-contained light source 38 is preferably a commercially available "slim line" flashlight having push bottom activation switch thereof. The light source 38 is received within the cavity 21 of handle core 20 such that the light producing bulb 44 of the light source is forward and abuts against the rear end of the pole 12 and cables 36. The size of the handle core 20 and placement of the pole 12 therein is arranged such that the rear end of the casing of light source 38 substantially corresponds to the rear end of the handle core 20.

An end cap 46 is threadably received upon the rear end of handle core 20. The end cap 46 includes a through hole 48 therein. The through hole 48 allows the push button switch 42 of light source 38 to extend outwardly therefrom. As such, the user may manually engage the switch of light source 38 without removing end cap 46.

As can be seen, when the light source 38 is mounted within handle core 20 and activated, the light emitted from the light source 38 is conveyed upon the fiber optic cables 36 into the interior of pole 12. As such, the light emitted from the cables 36 is visible through the pole 12 and serves to illuminate same.

Since the light source 38 is self-contained, it may be used in the same manner as a regular hand-held flashlight. By simply removing the end cap 46 the light source 38 may be easily removed as a unit from the cavity 21 of handle core 20 for use in and around the boat. A connector could also be provided between end cap 46 and handle core 20 to prevent the inadvertent loss of end cap 46 when it is not threadably engaged with handle core 20.

The light source 38, including the casing 40, batteries 41, switch 42 and bulb 44, is removable as a unit from the fishing rod simply by first removing the end cap of the handle. Consequently, replacement of the batteries or bulb of the light source 38 may be carried out quickly and easily without the need to disassemble a large number of parts and without the use of special tools to reach within the rod interior.

While the present invention has been described in detail above, it is to be understood that the embodiments described are illustrative only, and that the scope of the invention is defined solely by the appended claims.

The batteries 41 may be conventional batteries or, more preferably, rechargeable batteries.

The fiber optical cable 36 are preferably of the type which are "self generating". This type of optical fiber is able to receive a charge of light from the light source and remain energized or illuminated after the light source is removed or turned off. The light source may be sunlight or another source, and the fibers remain illuminated for a predetermined time, after which they must be charged again with light. By using this type of fiber, the fibers remain illuminated even if the batteries 41 are discharged or the bulb is damaged. The batteries can be replaced or recharged, or the bulb can be repaired or replaced, while the fibers continue to remit light.

What is claimed is:

1. A fishing rod comprising:
    a hollow pole having a handle end and a tip opposite said handle end, said pole being constructed of a light conductive material and tapering from said handle end to said tip end;
    a cavity in said pole extending from the handle end thereof to the tip end thereof, said cavity being open at the handle end and closed at the tip end;
    a handle adapted for manual grasping mounted on said handle end of the pole, said handle presenting a cavity therein open at a butt end of the handle and at a second end which is opposite said butt end and which is adjacent to the cavity in said pole at the handle end of the pole;
    a plurality of optical fibers extending inside of said cavity in the pole the entire length thereof, said fibers upon energization with light being illuminated along the entire length thereof and emitting light which is transmitted through said pole to illuminate the pole along the entire length thereof;
    a flashlight unit having a casing, a bulb on the casing at one end thereof for producing light when energized with electrical current, battery means in the casing for supplying current to the bulb, and a push button switch on the end of the casing opposite said one end thereof for connecting said battery means to the bulb and disconnecting said battery means therefrom, said flashlight unit being self contained and fitting closely in said cavity of the handle with said bulb abutting said optical fibers at the handle end of the pole to energize said fiber means with light when said bulb is energized with electrical current; and
    a removable end cap for detachable application to the butt end of the handle to close the cavity of the handle and retain said flashlight unit therein with said flashlight unit engaging the handle end of the pole at said one of the flashlight unit and engaging said end cap at said opposite end of the flashlight unit, said end cap having an opening through which said push button switch extends when said flashlight unit is fitted in the cavity and said end cap is applied to the butt end of the handle, said flashlight unit being removable from the cavity of said handle as a unit when the end cap is removed from the handle to permit the flashlight unit to be used in the manner of a flashlight.

2. The fishing rod of claim 1, wherein said cavity in the pole tapers from the handle end of the pole to the tip end thereof and said optical fibers have tip ends which are staggered along the length of the pole and are located internally of the pole in the cavity of the pole, one fiber having the tip end thereof at the tip end of the pole.

* * * * *